United States Patent
Frost et al.

(10) Patent No.: US 10,902,461 B2
(45) Date of Patent: Jan. 26, 2021

(54) ENVIRONMENTAL MODIFICATION USING TONE MODEL ANALYSIS

(71) Applicant: INTERNATIONAL BUSINESS MACHINES CORPORATION, Armonk, NY (US)

(72) Inventors: Keith G. Frost, Delaware, OH (US); Stephen A. Boxwell, Columbus, OH (US); Stanley J. Vernier, Grove City, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/054,628

(22) Filed: Aug. 3, 2018

(65) Prior Publication Data

US 2020/0043042 A1 Feb. 6, 2020

(51) Int. Cl.
*G06F 3/0481* (2013.01)
*G06Q 30/02* (2012.01)
(Continued)

(52) U.S. Cl.
CPC ....... *G06Q 30/0252* (2013.01); *G06F 3/0481* (2013.01); *G06F 16/9535* (2019.01); *G06Q 30/0255* (2013.01); *H04N 21/25841* (2013.01)

(58) Field of Classification Search
CPC .............. G06F 16/9535; G06F 3/0481; G06Q 30/0252; G06Q 30/0255; H04N 21/25841
See application file for complete search history.

(56) References Cited

U.S. PATENT DOCUMENTS 7,242,988 B1 * 7/2007 Hoffberg ............ G05B 19/0426
700/28
8,266,313 B2 * 9/2012 Pettinato ................. G06F 9/542
709/207

(Continued)

FOREIGN PATENT DOCUMENTS

EP 3062519 A1 8/2016

OTHER PUBLICATIONS

Fink et al.; "Social—and Interactive-Television Applications Based on Real-Time Ambient-Audio Identification", Proceedings of The 4th European Conference on, 2006, pp. 1-10.
(Continued)

*Primary Examiner* — Michael J Huntley
(74) *Attorney, Agent, or Firm* — Conley Rose, P.C.

(57) ABSTRACT

A computer-implemented method includes dividing a textual representation of a media content into a plurality of portions separated at temporal boundaries of the media content and performing an analysis of each portion of the plurality of portions of the textual representation of the media content to determine a characteristic associated with each respective portion of the textual representation of the media content, generating a multi-dimensional model assigning each determined characteristic to each associated respective portion of the plurality of portions of the textual representation of the media content, the multi-dimensional model identifying each determined characteristic and the temporal boundaries to enable control of an environmental control device to modify an environment proximate to a user based on the multi-dimensional model, and transmitting the multi-dimensional model to a user equipment configured to control the environmental control device to modify the environment proximate to the user based on the multi-dimensional model.

20 Claims, 6 Drawing Sheets

(51) Int. Cl.
*H04N 21/258* (2011.01)
*G06F 16/9535* (2019.01)

(56) References Cited

U.S. PATENT DOCUMENTS

| | | | |
|---|---|---|---|
| 8,412,530 B2* | 4/2013 | Pereg | G06F 17/279 |
| | | | 704/270 |
| 8,904,469 B2 | 12/2014 | Blackwell | |
| 8,938,447 B2 | 1/2015 | Van Den Dungen | |
| 9,547,626 B2 | 1/2017 | de Voogd | |
| 9,792,878 B2 | 10/2017 | Yoon et al. | |
| 9,838,485 B2 | 12/2017 | Harris et al. | |
| 10,051,239 B2* | 8/2018 | Stanford-Clark | |
| | | | H04N 21/26616 |
| 2009/0254836 A1* | 10/2009 | Bajrach | G11B 27/031 |
| | | | 715/745 |
| 2012/0310392 A1* | 12/2012 | Abuelsaad | G06T 13/205 |
| | | | 700/94 |
| 2013/0091429 A1* | 4/2013 | Weng | G06F 3/048 |
| | | | 715/716 |
| 2013/0166042 A1 | 6/2013 | Sharma et al. | |
| 2014/0080428 A1* | 3/2014 | Rhoads | H04W 4/70 |
| | | | 455/88 |
| 2015/0149922 A1 | 5/2015 | Wickramasuriya et al. | |
| 2016/0182971 A1* | 6/2016 | Ortiz | H04N 21/6125 |
| | | | 725/34 |
| 2017/0243246 A1 | 8/2017 | Rodriguez et al. | |
| 2017/0359668 A1 | 12/2017 | Smith et al. | |
| 2018/0007467 A1 | 1/2018 | Goran et al. | |
| 2018/0018699 A1 | 1/2018 | Rafizadeh et al. | |
| 2018/0032611 A1* | 2/2018 | Cameron | G06F 3/165 |
| 2018/0129276 A1* | 5/2018 | Nguyen | G06T 11/00 |
| 2018/0165854 A1* | 6/2018 | Du | G06F 3/01 |
| 2019/0206132 A1* | 7/2019 | Zielkowski | G02B 27/017 |
| 2019/0307982 A1* | 10/2019 | Brodsky | G05B 13/042 |
| 2019/0385613 A1* | 12/2019 | Mindlin | G10L 17/005 |

OTHER PUBLICATIONS

Wang et al.; "Stylized Ambient Displays of Digital Media Collections", Preprint Submitted to Computers & Graphics, vol. 35, Issue 1, Aug. 30, 2010, pp. 1-16.

Mantiuk et al.; "Display Adaptive Tone Mapping", SIGGRAPH'08 ACM Conference on, Article 68, vol. 25, Issue 3, Aug. 11-15, 2008, pp. 1-10.

Haubold et al.; "Segmentation, Indexing, and Visualization of Extended Instructional Videos", Cornell University Library, Feb. 16, 2003, pp. 1-8.

* cited by examiner

ENVIRONMENTAL MODIFICATION USING TONE MODEL ANALYSIS

BACKGROUND

The present disclosure relates to the field of environmental modification and control according to tonal analysis of media content.

The media content that a user consumes at a given time, whether visual, audible, or both, can give insight into the user's mental or emotional state at that given time. Modifying the environment around the user based on the media content can enhance or counteract the mental or emotional state and/or otherwise enhance the media content consumption experience.

SUMMARY

Aspects of the present disclosure provide for a computer program product comprising a computer readable storage medium having program instructions embodied therewith. The program instructions are executable by a processor to divide a textual representation of a media content into a plurality of portions separated at temporal boundaries of the media content. Executing the program instructions further causes the processor to perform an analysis of each portion of the plurality of portions of the textual representation of the media content to determine a characteristic associated with each respective portion of the plurality of portions of the textual representation of the media content. Executing the program instructions further causes the processor to generate a multi-dimensional model assigning each determined characteristic to each associated respective portion of the plurality of portions of the textual representation of the media content, the multi-dimensional model identifying each determined characteristic and the temporal boundaries to enable control of an environmental control device to modify an environment proximate to a user based on the multi-dimensional model. Executing the program instructions further causes the processor to transmit the multi-dimensional model to a user equipment configured to control the environmental control device to modify the environment proximate to the user based on the multi-dimensional model.

Other aspects of the present disclosure provide for a computer-implemented method. The method includes dividing a textual representation of a media content into a plurality of portions separated at temporal boundaries of the media content and performing an analysis of each portion of the plurality of portions of the textual representation of the media content to determine a characteristic associated with each respective portion of the plurality of portions of the textual representation of the media content. The method further includes generating a multi-dimensional model assigning each determined characteristic to each associated respective portion of the plurality of portions of the textual representation of the media content, the multi-dimensional model identifying each determined characteristic and the temporal boundaries to enable control of an environmental control device to modify an environment proximate to a user based on the multi-dimensional model and transmitting the multi-dimensional model to a user equipment configured to control the environmental control device to modify the environment proximate to the user based on the multi-dimensional model.

Other aspects of the present disclosure provide for an user equipment. The user equipment comprises a processor and a memory storage device coupled to the processor and comprising executable instructions. The executable instructions are configured to cause the processor to obtain a multi-dimensional model of a media content, the multi-dimensional model identifying a plurality of portions of the media content separated by temporal boundaries and at least one determined characteristic associated with each portion of the plurality of portions of the media content. Executing the instructions further causes the processor to generate a playlist of environmental augmentations corresponding to the at least one determined characteristic associated with each portion of the plurality of portions of the media content, wherein each environmental augmentation corresponds to a modification to an environment proximate to a user of the user equipment. Executing the instructions further causes the processor to control at least one environmental control device to augment the environment proximate to the user of the user equipment contemporaneously with consumption by the user of the media content and based on the generated playlist of environmental augmentations.

DETAILED DESCRIPTION

Disclosed herein are embodiments that provide for environmental modification according to tone model analysis. Media content, whether written, visual, audible, tactile, or any combination thereof, may have a tone or other characteristics associated with the media content. Augmenting the environment around a user consuming the media content by changing the environment in some manner, in some examples, enhances the user's experience in consuming the media content. For example, some implementations of the environmental augmentation engage additional senses of the user, resulting in a more immersive media consumption experience. Other examples of implementations of the environmental augmentation do not engage additional senses of the user other than those already engaged to consume the media, but instead provide additional stimuli to at least one of the senses already engaged to consume the media. In some examples, the media content undergoes pre-processing to generate a configuration file for controlling the environmental augmentation. In various examples, the pre-processing includes any one or more of generating a textual representation of the media content, dividing the textual representation according to a temporal distribution scheme, determining a tone of each portion of the divided textual representation, and assigning one or more environmental augmentation (e.g., one or more control signals configured to control and/or cause the environmental augmentations) to at least some portions of the divided textual representation. In some examples, at a time of consumption of the media content, an application (e.g., an application presenting the media content or a companion application that is not itself presenting the media content) requests an enhancement service (e.g., the enhancement service that performed the pre-processing) to perform one or more of the environmental augmentations assigned to at least some portions of the divided textual representation.

Figure 1:
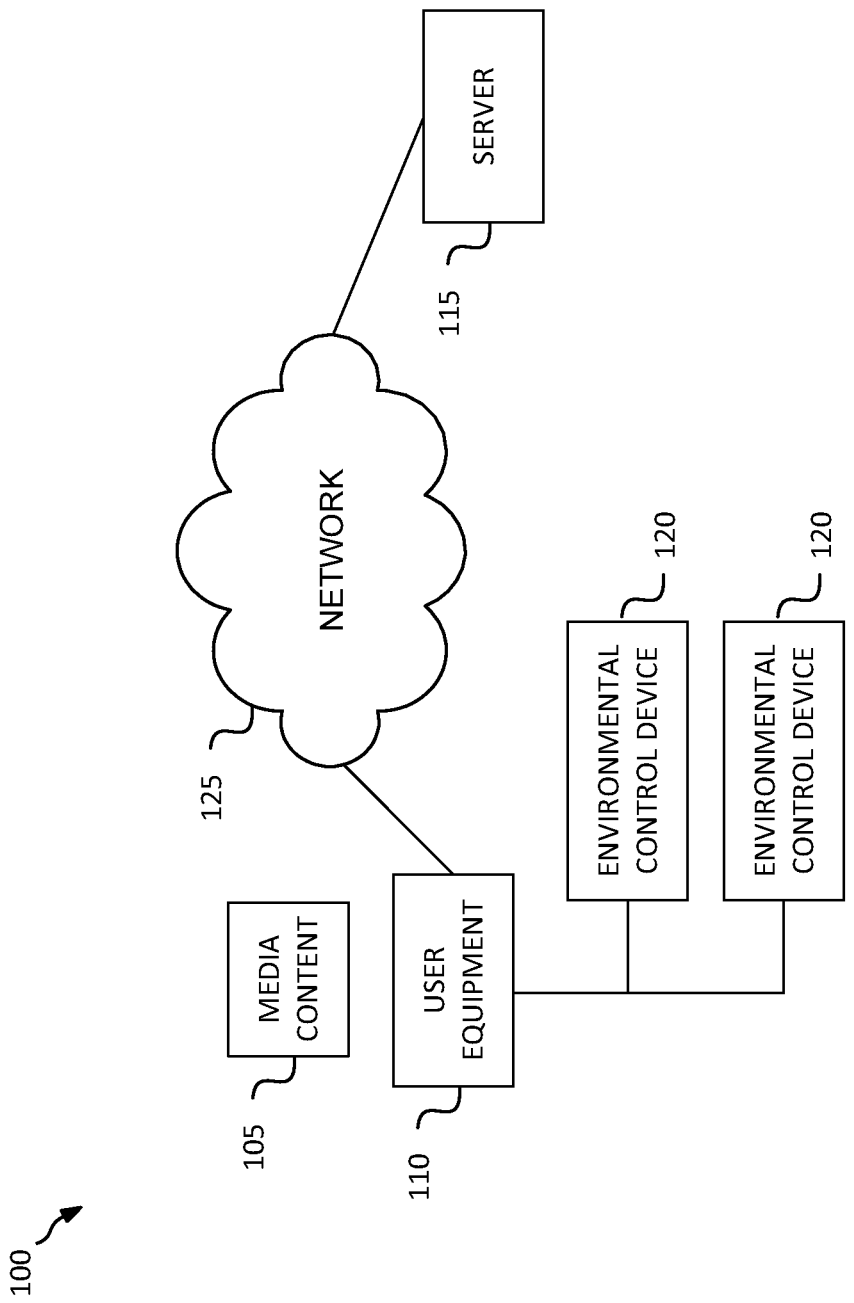
FIG. 1 is a block diagram of an illustrative system in accordance with various embodiments.

Referring now to FIG. 1, a block diagram of an illustrative system 100 in accordance with various embodiments is shown. In some examples, the system 100 is suitable for implementing at least some of the teachings of the present disclosure, including at least an environmental modification and/or augmentation according to tone model analysis. In some examples, the system 100 includes media content 105, a user equipment 110, a server 115, and at least one environmental control device 120. Though not illustrated, in some examples the system 100 includes a plurality of environmental control devices 120 suitable for controlling, modifying, and/or augmenting any number of environmental characteristics proximate to the user. In at least some examples, the user equipment 110 is communicatively coupled to the environmental control device 120 and/or the server 115 via a network 125. In other examples, the user equipment 110 is communicatively coupled to the environmental control device 120 via the network 125 and the user equipment 110 is communicatively coupled to the server 115 via a second network (not shown). For example, the network 125 may be a wireless local area network (WLAN) having Internet connectivity to couple to the server 115 and the second network may be a short-range communication network.

In some examples, the media content 105 lacks network connectivity and/or takes a physical form separate and distinct from the user equipment 110. For example, the media content 105 can be any one of a book, a board or other game, an audio file (e.g., electronic file, cassette tape, compact disc, record, etc.) playable on an audio player lacking network connectivity, an image (e.g., still image, animated set of images, and/or video with or without accompanying audio) playable on an image presentation device lacking network connectivity, etc. In other examples, the media content 105 is presented by the user equipment 110, for example, in or by an application of the user equipment 110. For example, the media content 105 can be an electronic book (e-book), an electronic game (e.g., video game), an image (e.g., still image, animated set of images, and/or video with or without accompanying audio), etc.

In some examples, the user equipment 110 is any consumer electronic device suitable for implementing the teachings of the present disclosure. In various examples, the user equipment 110 is any one of a smartphone, a tablet, a laptop (e.g., laptop or desktop), a wearable device (e.g., smartwatch, smart glasses, or smart lens). In some examples, although unshown, a plurality of user equipments 110 may be present and configured to interact to provide the functionality of the present disclosure. In yet other examples, the user equipment 110 additionally functions as an environmental control device 120. For example, when the user equipment 110 is a smartwatch, or a smartwatch is included among a plurality of user equipments 110, the smartwatch may function as an environmental control device 120 by providing tactile feedback to the user via a vibration motor included within the smartwatch. In yet other examples, the user equipment 110 includes sensors monitorable to provide further input for controlling at least some of the environmental control devices 120. In some examples, the server 115 is any computing device, such as a cloud-computing device, suitable for performing processing according to the teachings of the present disclosure. In at least one example, the server 115 performs at least a portion of the pre-processing disclosed herein. In another example, the server 115 performs all of the pre-processing disclosed herein, the user equipment 110 performs at least a portion of the pre-processing disclosed herein, or the user equipment performs all of the pre-processing disclosed herein.

In some examples, the environmental control devices 120 include any network connected devices capable of receiving a control input and effecting a change in an output or state of the respective environmental control device 120 receiving the control input, or another device (not shown) coupled to the environmental control device 120 receiving the control input and subject to control by the environmental control device 120 receiving the control input. In various examples, the environmental control devices 120 can include audio devices (e.g., such that the environmental control device 120 plays audio subject to the control input), light emitting devices, scent emitting devices, one or more actuators that cause motion (e.g., one or more actuators coupled to a seat to provide motion for the seat in one or more dimensions or directions), liquid emitting devices (e.g., a mister or sprayer), a heating or cooling system, a smoke machine, light switch, etc.

In an example of operation of the system 100, the server 115 performs pre-processing of the media content 105. In some examples, the pre-processing is manually initiated. In other examples, the pre-processing is automatically implemented, for example, as a result of a schedule, resulting from a crawling process that identifies the media content 105, on receipt of the media content 105, or on receipt of a textual representation of the media content 105, by the server 115. In some examples, the pre-processing begins with a textual representation of the media content 105. For example, the textual representation can be the text of a book, the lyrics of a song, a screenplay or script corresponding to a movie, a description of the scene captured in an image, etc. In other examples, the pre-processing begins with the media content 105 itself. In such examples, the server 115 begins the pre-processing by generating the textual representation of the media content 105. The server 115 generates the textual representation of the media content 105 according to any suitable method, the scope of which is not limited herein. In at least some examples, generation of the textual representation of the media content 105 may include invoking a transcription application executable by the server 115, transmitting the media content 105 from the server 115 to a transcription service, and/or invoking a transcription application programming interface (API) that access a transcription service or system (e.g., such as provided by a cloud-computing and/or cognitive computing system).

After the server 115 has obtained the textual representation of the media content 105, either through receipt or generation, the textual representation of the media content 105 is divided into multiple portions. In some examples, the textual representation of the media content 105 is divided according to temporal distributions. The temporal distributions include, for example, changes in page, changes in chapter, changes in scene, changes in act, etc. In other examples, the textual representation of the media content 105 is divided according to any other suitable distributions. For example, the textual representation of the media content 105 may be processed by a cognitive computing system to identify distributions related to human perception or what the human mind naturally expects to occur (or not occur) corresponding to a particular portion of the textual representation of the media content 105.

The server 115 next processes the portions of the textual representation of the media content 105 according to a tone analysis service or system. The tone analysis, in some examples, indicates a tone associated with each portion of the textual representation of the media content 105. In at least some examples, the tone is selected from among tones of anger, fear, joy, sadness, analytical, confident, and/or tentative. The server 115 performs the tone analysis according to any suitable method, the scope of which is not limited herein. In at least some examples, performing the tone analysis may include invoking a tone analysis application executable by the server 115, transmitting the portions of the textual representation of the media content 105 from the server 115 to a tone analysis service or system, and/or invoking a tone analysis API that accesses a tone analysis service or system (e.g., such as provided by a cloud-computing and/or cognitive computing system). In other examples, the server 115 additionally, or alternatively, performs other analyses on the portions of the textual representation of the media content 105, such as cognitive processing. In various examples, the cognitive processing identifies a mood, emotion, sentiment, and or any other cognitive characteristic or dimension associated with a portion of the textual representation of the media content 105. The cognitive processing is performed by invoking a cognitive computing application executable by the server 115, transmitting the portions of the textual representation of the media content 105 from the server 115 to a cognitive computing service or system, and/or invoking a cognitive computing API that accesses a cognitive computing service or system (e.g., such as provided by a cloud-computing and/or cognitive computing system).

Based on the processing, the server 115 assigns or associates at least one tone (or cognitive characteristic) to each portion of the textual representation of the media content 105. In some examples, the server 115 creates a multi-dimensional model representing the media content 105 and incorporating the at least one tone or cognitive characteristic associated with each portion of the media content 105. The server 115 subsequently saves the multi-dimensional model for use as the user consumes the media content 105. For example, the server 115 saves the multi-dimensional model in a configuration file. In some examples, the server 115 transmits the configuration file to the user equipment 110. In other examples, the server 115 stores the configuration file (ether within the server 115 or in an external data store (not shown) to provide to the user equipment 110 at a later time, such as in response to a request from the user equipment 110).

At, or near, a time of consumption of the media content 105 by the user, the user equipment 110 invokes, executes, or otherwise activates an application configured to access and utilize the configuration file. For example, when the user accesses the media content 105 via the user equipment 110, the application activates. In some examples, upon activation of the application, the user equipment 110 transmits a request for the configuration file to the server 115 and receives the configuration file in response. In some examples, the user equipment 110 generates the request automatically, while in other examples the user equipment 110 generates the request responsive to receipt of a user input identifying the media content 105 such that the user equipment 110 requests that the server 115 provide a configuration file corresponding to the media content 105, if such a configuration file exists accessible by the server 115. In other examples, the user equipment 110 has previously received the configuration file, either from the server 115 or as a part of the media content 105. In some examples, the application is a companion application configured to compliment and/or supplement consumption of the media content 105 through the presentation of additional media content and/or environmental augmentation as disclosed herein. In other examples, the application both presents the media content 105 for consumption and supplements the consumption of the media content 105 through environmental augmentation as disclosed herein.

Based on the configuration file, the user equipment 110 (e.g., via the application) controls one or more of the environmental control devices 120 to perform environmental augmentation. In some examples, the user equipment 110 determines an environmental augmentation and a corresponding environmental control device 120 from among the environmental control devices 120 communicatively coupled to the user equipment 110 based on a content of the configuration file (e.g., a tone associated with a particular portion of the textual representation of the media content 105). In other examples, the environmental augmentation and/or identification of the corresponding environmental control device 120 is also included in the configuration file and the user equipment 110 controls the environmental control device 120 indicated in the configuration file if the user equipment 110 is communicatively coupled to the environmental control device 120 indicated in the configuration file. In some examples, the user equipment 110 generates an environmental augmentation playlist or control sequence that creates an ordered listing of environmental augmentations corresponding to the media content 105 such that as the user passes from one portion of the media content 105 to another portion of the media content 105 (or from one tone or cognitive dimension of the media content 105 to another tone or cognitive dimension of the media content 105), the user equipment 110 triggers the next environmental augmentation on the playlist. Generating the environmental augmentation playlist, in some examples, mitigates and or eliminates breaks or delays in transitioning from one environmental augmentation to a subsequent environmental augmentation.

The user equipment 110 controlling one of the environmental control devices 120 according to the configuration file may take numerous forms depending on the particular environmental control devices 120 accessible to the user equipment 110. In one example, the user equipment 110 controls an environmental control device 120 to emit sound at least partially according to the configuration file. In another example, the user equipment 110 controls an environmental control device 120 to emit light, or modify an emission of light (e.g., hue, intensity, etc.), at least partially according to the configuration file. In another example, the user equipment 110 controls an environmental control device 120 to emit a scent, or modify an emission of light (e.g., intensity) at least partially according to the configuration file. In another example, the user equipment 110 controls an environmental control device 120 to emit liquid (e.g., water spray or mist) at least partially according to the configuration file. In another example, the user equipment 110 controls an environmental control device 120 to modify a position of a physical object at least partially according to the configuration file. In another example, the user equipment 110 controls an environmental control device 120 to turn another device on or off (e.g., when the environmental control device 120 is a controllable switch or outlet) at least partially according to the configuration file. In another example, the user equipment 110 controls an environmental control device 120 to modify a temperature and/or amount of airflow (e.g., as provided by a heating and/or air conditioning system) at least partially according to the configuration file. In yet other examples, the user equipment 110 controls an environmental control device 120 to perform any function, operation, or action available to the environmental control device 120 when the environmental control device is an Internet of Things (IoT), or otherwise network-connected, device capable of augmenting the environment proximate to the user consuming the media content 105 at least partially according to the configuration file. While discussed herein as the environmental control device 120 performing the action (e.g., changing the temperature, emitting the light, emitting the audio, emitting the scent, etc.), in some examples the environmental control device 120 is a control module or control interface for another device or system that performs the action. For example, the environmental control device 120 may be a network-connected thermostat, the controlling of which results in the control of a heating and cooling system to make the environmental augmentation.

In some examples, the user equipment 110 further controls the environmental control device 120 according to a consumption speed of the user consuming the media content 105, when the consumption speed is available to the user equipment 110 (e.g., via one or more sensors and/or when the user equipment 110 is presenting the media content 105 for consumption). In other examples, the user equipment 110 further controls the environmental control device 120 according to input received from one or more sensors (e.g., sensors included in the user equipment 110 or sensors (not shown) external to the user equipment 110 and communicatively coupled to the user equipment 110) that sense environmental conditions or characteristics proximate to the user and/or characteristics of the user (such as heartbeat, emotional state, etc.).

In at least some examples, the user equipment 110 controlling at least some of the plurality of environmental control devices 120 according to the configuration file controls the at least some of the plurality of environmental control devices 120 based on a tone of the media content 105 either at a specific time of control of the at least some of the plurality of environmental control devices 120 or a general tone for a portion of the media content 105. The controlling may be complimentary to the tone of the media content 105 or contrary to the tone of the media content 105. In other examples, controlling at least some of the plurality of environmental control devices 120 according to the configuration file controls the at least some of the plurality of environmental control devices 120 based on a cognitive dimension (e.g., emotion, mood, or sentiment) of the media content 105 either at a specific time of control of the at least some of the plurality of environmental control devices 120 or a general cognitive dimension for a portion of the media content 105. The controlling may be complimentary to the cognitive dimension of the media content 105 or contrary to the cognitive dimension of the media content 105. In yet other examples, controlling at least some of the plurality of environmental control devices 120 according to the configuration file controls the at least some of the plurality of environmental control devices 120 based on a sensed characteristic of the user (e.g., such as emotional state) or the user's environment. The controlling may be complimentary to the sensed characteristic of the user or the user's environment or contrary to the sensed characteristic of the user or the user's environment. In some examples, the user equipment 110 controls the at least some of the plurality of environmental control devices 120 according to a plurality of the factors discussed here (e.g., the sensed characteristic of the user and the cognitive dimension of the media content 105, the sensed characteristic of the user and the tone of the media content 105, the tone of the media content 105 and the cognitive dimension of the media content 105, etc.).

Figure 2:
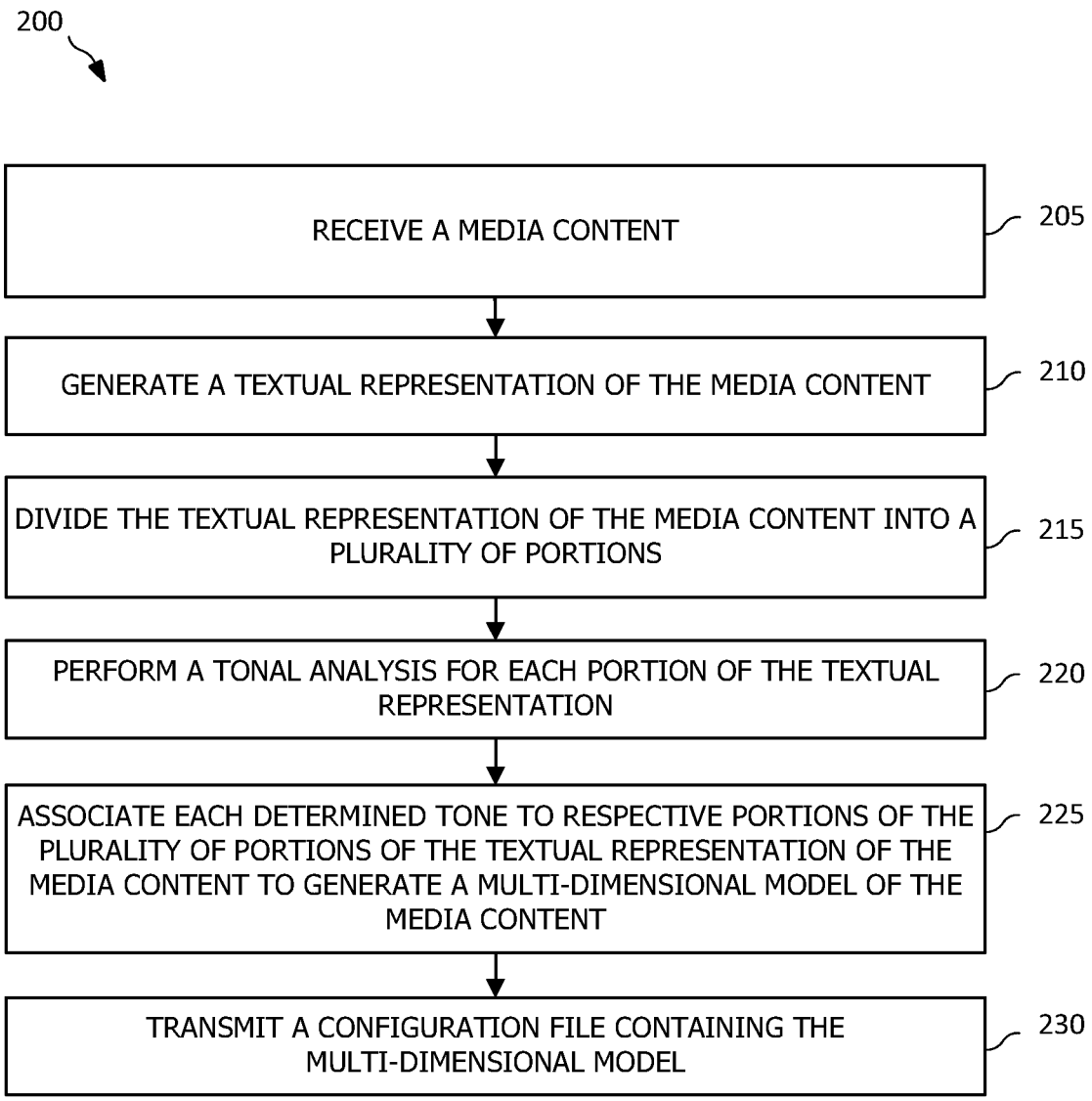
FIG. 2 is a block diagram of an illustrative method in accordance with various embodiments.

Referring now to FIG. 2, a flowchart of an illustrative method 200 in accordance with various embodiments is shown. In some examples, the method 200 is suitable for implementation at least partially by the user equipment 110 or the server 115, each of FIG. 1, or a combination of both the user equipment 110 and the server 115. In some examples, the method 200 is implemented to perform pre-processing of a media content to facilitate environmental augmentation, as disclosed herein. The operations of method 200 are implementable by the user equipment 110 or the server 115 without limitation, and thus a particular device implementing each operation of the method 200 therefore is not specified.

At operation 205, a media content is received. In some examples, the media content is received from a user, for example, accompanying a request to prepare environmental augmentation controls corresponding to the media content. In other examples, the media content is received from a repository to which content producers upload media content to initiate preparation of environmental augmentation controls corresponding to the media content. In yet other examples, the media content is obtained as a part of a crawling process that identifies and obtains publicly available media content for preparation of environmental augmentation controls corresponding to the media content.

At operation 210, a textual representation of the media content is generated. In some examples, operation 205 is omitted and the method begins at operation 210 when a textual representation of the media content is received in place of receiving the media content itself. The textual representation of the media content is generated according to any suitable means, the scope of which is not limited herein. For example, the textual representation of the media content may be generated by executing, invoking, or otherwise utilizing (including through transmission of the media content to a third-party or device other than the user equipment 110 or the server 115) a transcription application or service, performing image recognition, performing optical character recognition, or any other suitable form of processing for generating a textual representation of the media content.

At operation 215, the textual representation of the media content is divided into a plurality of portions. In some examples, each portion of the media content is defined as beginning and ending at respective boundaries. Additionally, one or more of the beginning or the end of each portion may be associated with a cognitive dimension or cognitive boundary. In some examples, the textual representation is divided into the plurality of portions according to temporal boundaries such as a page, a verse, a chapter, an act, a scene, a dialogue, or any other temporal boundary at which a transition may be expected and/or logical. In some examples, the portions are further, or alternatively, divided according to cognitive dimensions such that portions of the textual representation share a common mood, emotional sentiment, etc.

At operation 220, a tonal analysis is performed for each portion of the textual representation. In some examples, the tonal analysis of a respective portion of the textual representation determines a tone associated with that portion of the textual representation. In other examples, additionally, or alternatively, a cognitive analysis is performed for each portion of the textual representation. The cognitive analysis of a respective portion of the textual representation identifies, for example, cognitive dimensions or characteristics such as emotion, mood, and/or sentiment associated with that portion of the textual representation.

At operation 225, results of the operation 220 analysis (or analyses) are associated with each respective portion of the textual representation to generate a multi-dimensional model of the media content. The multi-dimensional model is subsequently saved as, or in, a configuration file associated with the media content.

In some examples, the method 200 further includes operation 230 at which the configuration file is transmitted from the server 115 to the user equipment 110. In other examples, at operation 230, the configuration file is stored by the server 115 (or the user equipment 110) in a data store for later retrieval and use.

Figure 3:
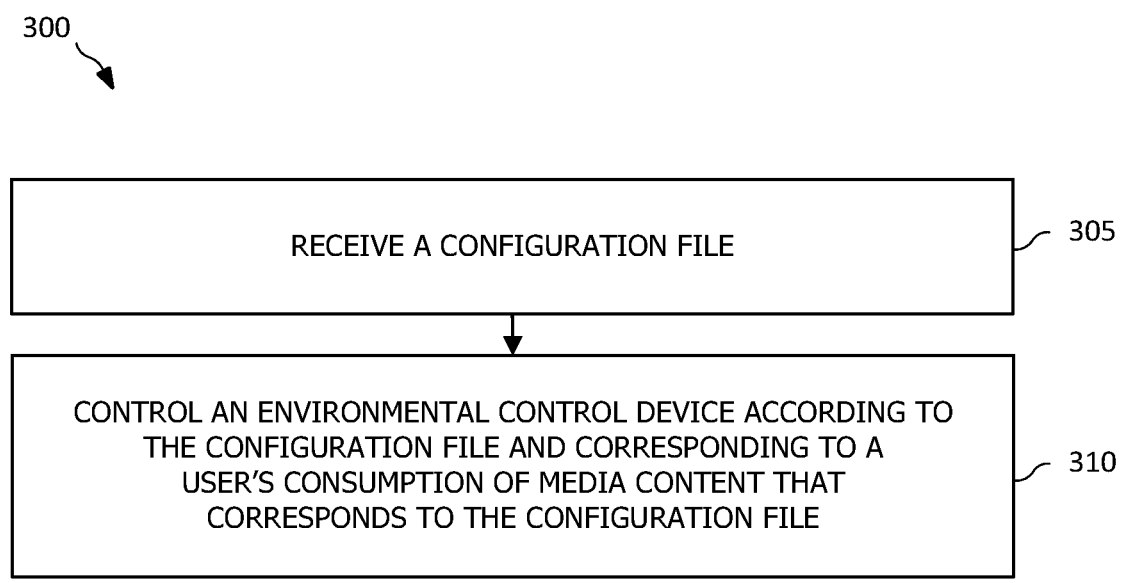
FIG. 3 is a flowchart of an illustrative method in accordance with various embodiments.

Referring now to FIG. 3, a flowchart of an illustrative method 300 in accordance with various embodiments is shown. In some examples, the method 300 is suitable for implementation by a user equipment, such as at least partially by the user equipment 110 of FIG. 1. In some examples, the method 300 is implemented to perform environmental augmentation, as disclosed herein.

At operation 305, the user equipment receives a configuration file. In at least some examples, the configuration file corresponds to a media content and associates at least one of a tone or a cognitive dimension with each of a plurality of portions of the media content, where each portion of the media content is defined by a temporal boundary. In some examples, the configuration file is received from a server, such as the server 115 of FIG. 1 (and generated according to the method 200), while in other examples the configuration file is received from a data store of the user equipment after generation by the user equipment.

Optionally, at operation 310, the user equipment generates an environmental augmentation playlist or control sequence. In at least one example, the environmental augmentation playlist creates an ordered listing of environmental augmentations corresponding to the media content such that as the user passes from one portion of the media content to another portion of the media content (or from one tone or cognitive dimension of the media content to another tone or cognitive dimension of the media content), the user equipment triggers the next environmental augmentation on the playlist. Generating the environmental augmentation playlist, in some examples, mitigates and or eliminates breaks or delays in transitioning from one environmental augmentation to a subsequent environmental augmentation.

At operation 315, the user equipment controls an environmental control device according to the configuration file and corresponding to a user's consumption of the media content that corresponds to the configuration file. For example, as the user reaches the temporal boundaries of the media content as defined in the configuration file, the user equipment transmits one or more control signals to one or more environmental control devices to control the environmental control device to augment the environment proximate to the user. The environmental augmentation may take numerous forms, the scope of which is not limited herein, and illustrative examples of which are provided above with respect to FIG. 1.

Figure 4:
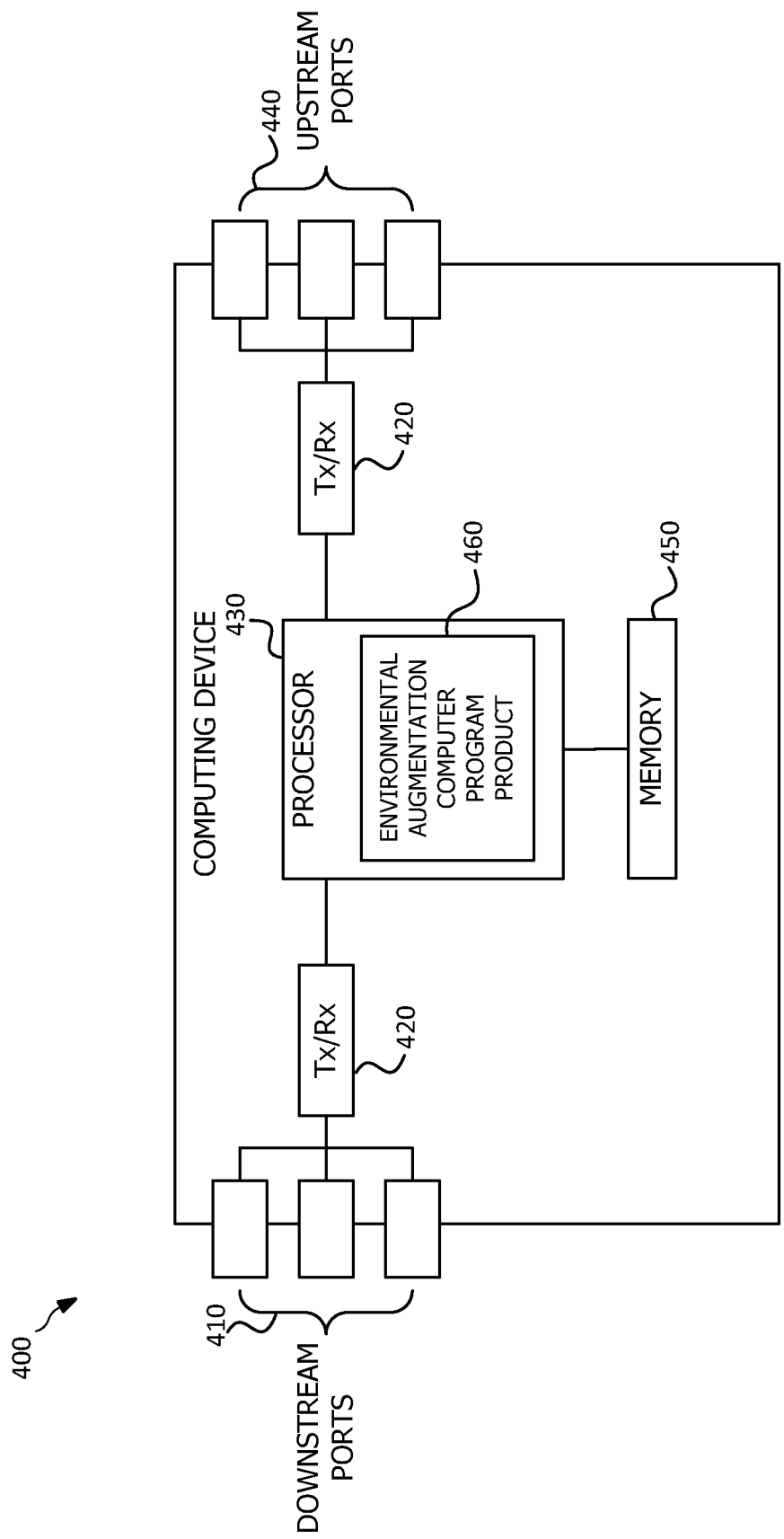
FIG. 4 is a block diagram of a computing device in accordance with various embodiments.

Referring now to FIG. 4, a block diagram of a computing device 400 according to various embodiments is shown. Computing device 400 is any suitable processing device capable of performing the functions disclosed herein such as a processing device, a user equipment, an environmental control device, an IoT device, a computer system, a server, a computing resource, a cloud-computing node, a cognitive computing system, etc. Computing device 400 is configured to implement at least some of the features/methods disclosed herein, for example, the environmental augmentation, such as described above with respect to system 100, method 200, and/or method 300. For example, the computing device 400 is implemented as, or implements, any one or more of the user equipment 110, server 115, and/or environmental control device 120. In various embodiments, for instance, the features/methods of this disclosure are implemented using hardware, firmware, and/or software (e.g., such as software modules) installed to run on hardware. In some embodiments, the software utilizes one or more software development kits (SDKs) or SDK functions to perform at least some of the features/methods of this disclosure.

In some examples, the computing device 400 is an all-in-one device that performs each of the aforementioned operations of the present disclosure, or the computing device 400 is a node that performs any one or more, or portion of one or more, of the aforementioned operations. In one embodiment, the computing device 400 is an apparatus and/or system configured to provide the environmental augmentation as described with respect to system 100, method 200, and/or method 300, for example, according to a computer program product executed on, or by, at least one processor.

The computing device 400 comprises one or more input devices 410. Some of the input devices 410 include at least some of cameras, magnetic sensors, temperature sensors, pressure sensors, accelerometers, microphones, keyboards, touchscreens, buttons, toggle switches, and/or other devices that allow a user to interact with, and/or provide input actively or passively to, the computing device 400. Some other of the input devices 410 are downstream ports coupled to a transceiver (Tx/Rx) 420, which are transmitters, receivers, or combinations thereof. The Tx/Rx 420 transmits and/or receives data to and/or from other computing or electronic devices via at least some of the input devices 410. Similarly, the computing device 400 comprises a plurality of output devices 440. Some of the output devices 440 include at least some of speakers, a display screen (which, in some examples, is also an input device such as a touchscreen), lights, or any other device that allows a user to interact with, and receive output from, the computing device 400. At least some of the output devices 440 are upstream ports coupled to another Tx/Rx 420, wherein the Tx/Rx 420 transmits and/or receives data from other nodes via the upstream ports. The downstream ports and/or the upstream ports include electrical and/or optical transmitting and/or receiving components. In another embodiment, the computing device 400 comprises one or more antennas (not shown) coupled to the Tx/Rx 420. The Tx/Rx 420 transmits and/or receives data from other computing or storage devices wirelessly via the one or more antennas. In yet other embodiments, the computing device 400 includes additional Tx/Rx 420 such that the computing device 400 has multiple networking or communication interfaces, for example, such that the computing device 400 communicates with a first device using a first communication interface (e.g., such as via the Internet) and communicates with a second device using a second communication interface (e.g., such as another computing device 400 without using the Internet).

A processor 430 is coupled to the Tx/Rx 420 and at least some of the input devices 410 and/or output devices 440 and is configured to implement the environmental augmentation. In an embodiment, the processor 430 comprises one or more multi-core processors and/or memory modules 450, which functions as data stores, buffers, etc. The processor 430 is implemented as a general processor or as part of one or more application specific integrated circuits (ASICs), field-programmable gate arrays (FPGAs), and/or digital signal processors (DSPs). Although illustrated as a single processor, the processor 430 is not so limited and alternatively comprises multiple processors. The processor 430 further comprises processing logic configured to execute an environmental augmentation computer program product 460 that is configured to implement the environmental augmentation as described above with respect to system 100, method 200, and/or method 300.

FIG. 4 also illustrates that a memory module 450 is coupled to the processor 430 and is a non-transitory medium configured to store various types of data. Memory module 450 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 450 houses the instructions for carrying out the various embodiments described herein. For example, the memory module 450 comprises the environmental augmentation computer program product 460, which is executed by processor 430.

It is understood that by programming and/or loading executable instructions onto the computing device 400, at least one of the processor 430 and/or the memory module 450 are changed, transforming the computing device 400 in part into a particular machine or apparatus, for example, an environmental augmentation system having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change is preferred to be implemented in software, because re-spinning a hardware implementation is more expensive than re-spinning a software design. Generally, a design that is stable and will be produced in large volume is preferred to be implemented in hardware (e.g., in an ASIC) because for large production runs the hardware implementation is less expensive than software implementations. Often a design is developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions is a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language, and functional programming languages such as Haskell or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
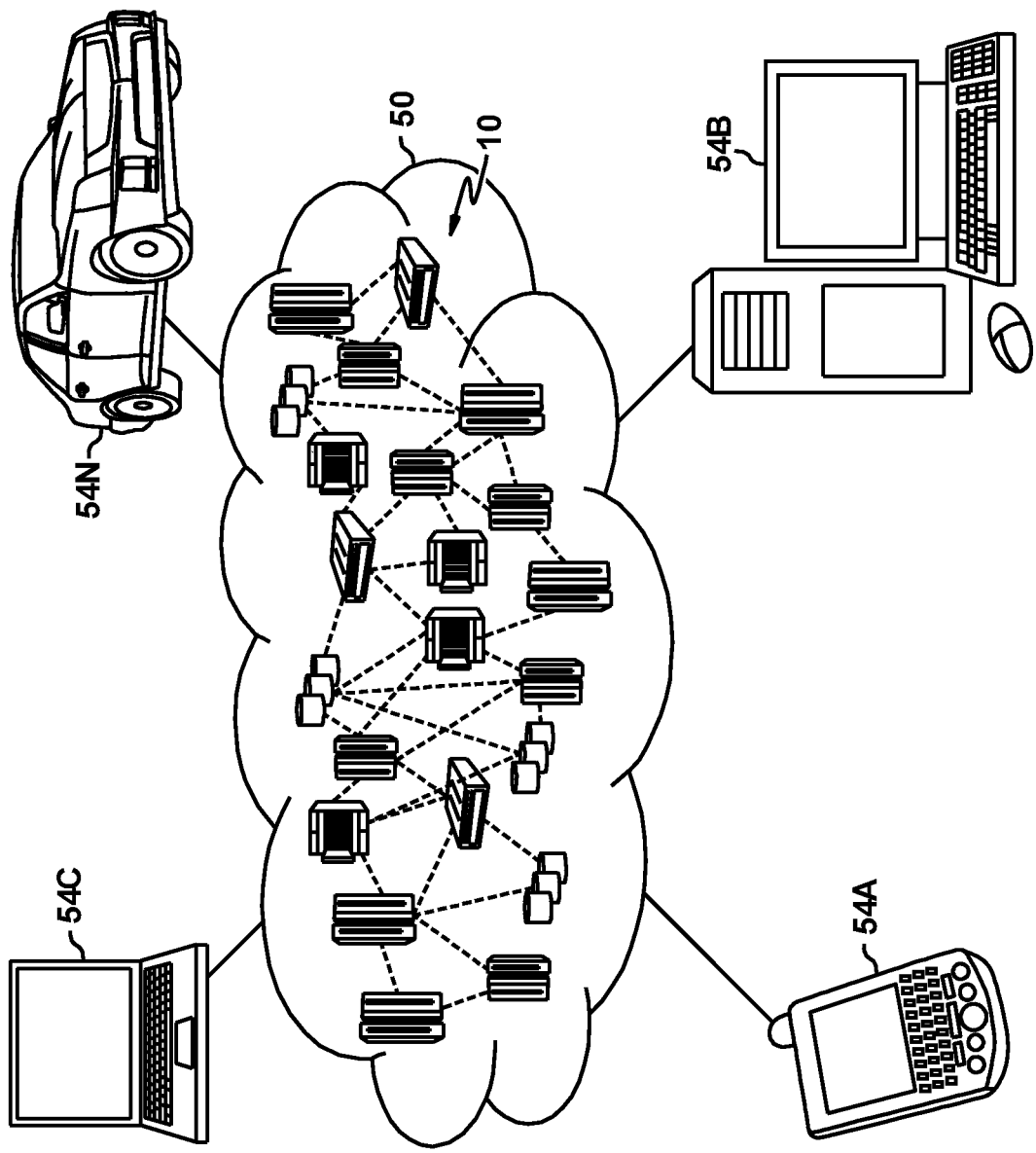
FIG. 5 is a diagram of a cloud-computing environment according to various embodiments.
Figure 6:
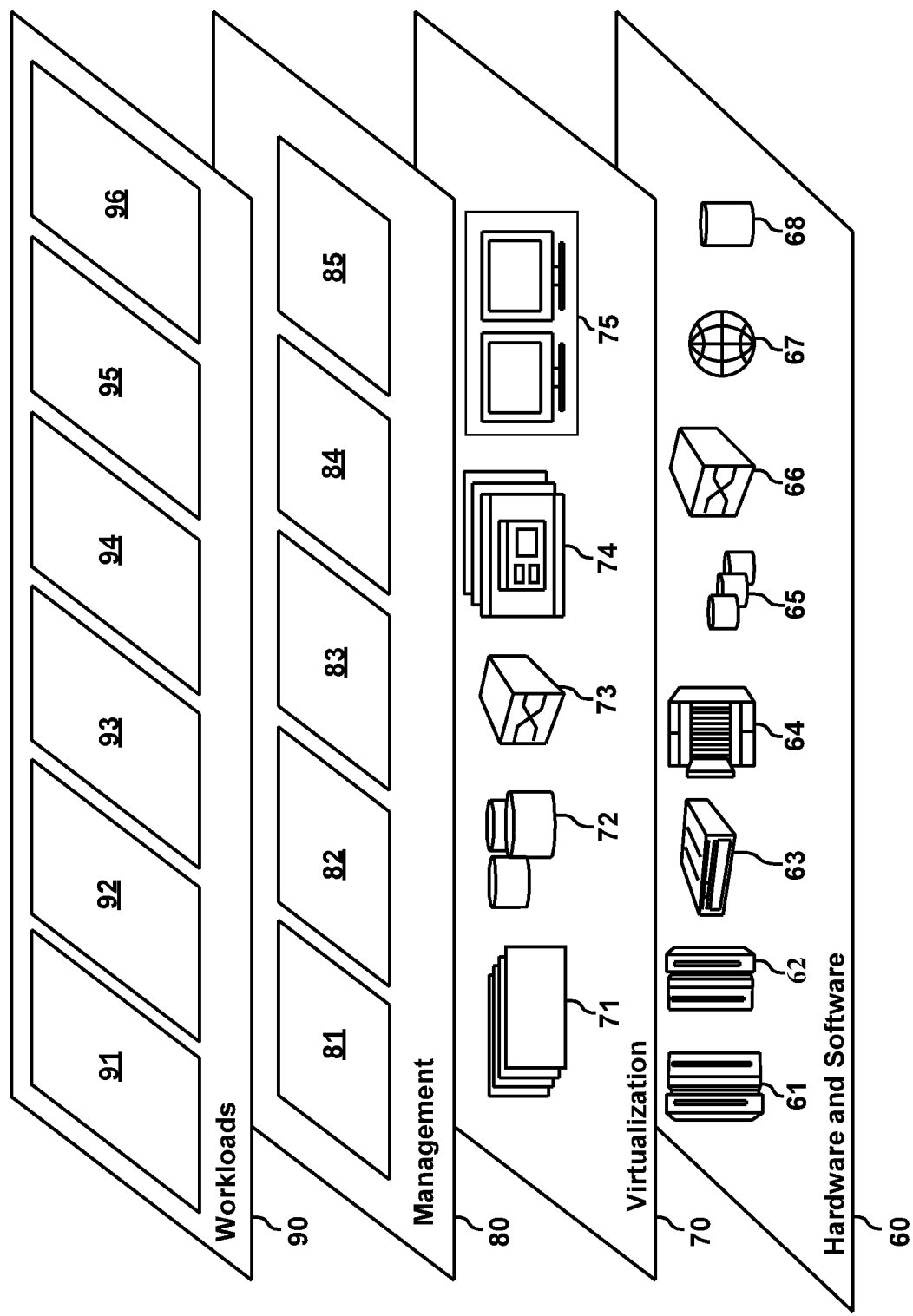
FIG. 6 is a diagram of abstraction model layers according to various embodiments.

Turning now to FIG. 5 and FIG. 6, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the environmental augmentation described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtualization layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and environmental augmentation 96. These workloads and functions of workloads layer 90 may be end-user applications that enable a subscriber to cloud computing environment 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing environment 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about," "approximately," or "substantially" preceding a value means+/−10 percent of the stated value or reference.

What is claimed is:

1. A computer program product comprising a non-transitory computer readable storage medium having program instructions embodied therewith, the program instructions executable by a processor to:
   divide a textual representation of a media content into a plurality of portions separated at temporal boundaries of the media content;
   perform an analysis of each portion of the plurality of portions of the textual representation of the media content to determine a characteristic associated with each respective portion of the plurality of portions of the textual representation of the media content, wherein each determined characteristic corresponds to a human sensory perception associated with each respective portion of the plurality of portions of the textual representation of the media content;
   generate a multi-dimensional model assigning each determined characteristic to each associated respective portion of the plurality of portions of the textual representation of the media content, the multi-dimensional model identifying each determined characteristic and the temporal boundaries to enable control of an environmental control device to modify an environment proximate to a user based on the multi-dimensional model to cause the environment proximate to the user to simulate at least a portion of the human sensory perception; and
   transmit the multi-dimensional model to a user equipment configured to control the environmental control device to modify the environment proximate to the user based on the multi-dimensional model, wherein the multi-dimensional model is configured to cause the environmental control device to engage a second physical sense of a consumer of the media content that is different than a first physical sense of the consumer engaged by the media content when the consumer is consuming the media content.

2. The computer program product of claim 1, wherein the processor further:
   receives the media content; and
   generates the textual representation of the media content.

3. The computer program product of claim 1, wherein the analysis is a tonal analysis and the determined characteristic associated with each respective portion of the plurality of portions of the textual representation of the media content is a tone associated with each respective portion of the plurality of portions of the textual representation of the media content.

4. The computer program product of claim 1, wherein the analysis is a cognitive analysis and the determined characteristic associated with each respective portion of the plurality of portions of the textual representation of the media content is a cognitive dimension associated with each respective portion of the plurality of portions of the textual representation of the media content.

5. The computer program product of claim 1, wherein the processor further generates a configuration file including the multi-dimensional model and associates the configuration file with the media content.

6. The computer program product of claim 1, wherein the temporal boundaries include at least one of a change in page, a change in chapter, a change in scene, a change in act, a change in dialog, or a change in verse.

7. The computer program product of claim 1, wherein the processor further receives the textual representation of the media content with a request to generate the multi-dimensional model of the media content.

8. A computer-implemented method, comprising:
dividing a textual representation of a media content into a plurality of portions separated at temporal boundaries of the media content;
performing an analysis of each portion of the plurality of portions of the textual representation of the media content to determine a characteristic associated with each respective portion of the plurality of portions of the textual representation of the media content, wherein each determined characteristic corresponds to a human sensory perception associated with each respective portion of the plurality of portions of the textual representation of the media content;
generating a multi-dimensional model assigning each determined characteristic to each associated respective portion of the plurality of portions of the textual representation of the media content, the multi-dimensional model identifying each determined characteristic and the temporal boundaries to enable control of an environmental control device to modify an environment proximate to a user based on the multi-dimensional model to cause the environment proximate to the user to simulate at least a portion of the human sensory perception; and
transmitting the multi-dimensional model to a user equipment configured to control the environmental control device to modify the environment proximate to the user based on the multi-dimensional model, wherein the modified environment is configured to engage a second physical sense of a consumer of the media content that is different than a first physical sense of the consumer engaged by the media content when the consumer is consuming the media content.

9. The computer-implemented method of claim 8, further comprising receiving the textual representation of the media content with a request to generate the multi-dimensional model of the media content.

10. The computer-implemented method of claim 8, further comprising:
receiving the media content; and
generating the textual representation of the media content.

11. The computer-implemented method of claim 8, wherein the analysis is a tonal analysis and the determined characteristic associated with each respective portion of the plurality of portions of the textual representation of the media content is a tone associated with each respective portion of the plurality of portions of the textual representation of the media content.

12. The computer-implemented method of claim 8, wherein the analysis is a cognitive analysis and the determined characteristic associated with each respective portion of the plurality of portions of the textual representation of the media content is a cognitive dimension associated with each respective portion of the plurality of portions of the textual representation of the media content.

13. The computer-implemented method of claim 8, further comprising generating a configuration file including the multi-dimensional model and associating the configuration file with the media content.

14. The computer-implemented method of claim 8, wherein the temporal boundaries include at least one of a change in page, a change in chapter, a change in scene, a change in act, a change in dialog, or a change in verse.

15. A user equipment, comprising:
a processor; and
a memory storage device coupled to the processor and comprising executable instructions configured to cause the processor to:
divide a textual representation of a media content into a plurality of portions separated at temporal boundaries of the media content;
perform an analysis of each portion of the plurality of portions of the textual representation of the media content to determine a characteristic associated with each respective portion of the plurality of portions of the textual representation of the media content, wherein each determined characteristic corresponds to a human sensory perception associated with each respective portion of the plurality of portions of the textual representation of the media content;
generate a multi-dimensional model assigning each determined characteristic to each associated respective portion of the plurality of portions of the textual representation of the media content, the multi-dimensional model identifying each determined characteristic and the temporal boundaries to enable control of an environmental control device to modify an environment proximate to a user based on the multi-dimensional model to cause the environment proximate to the user to simulate at least a portion of the human sensory perception; and
transmit the multi-dimensional model to another user equipment configured to control the environmental control device to modify the environment proximate to the user based on the multi-dimensional model, wherein the multi-dimensional model is configured to cause the environmental control device to engage a second physical sense of a consumer of the media content that is different than a first physical sense of the consumer engaged by the media content when the consumer is consuming the media content.

16. The user equipment of claim 15, wherein the processor further:
receives the media content; and
generates the textual representation of the media content.

17. The user equipment of claim 15, wherein the analysis is a tonal analysis and the determined characteristic associated with each respective portion of the plurality of portions of the textual representation of the media content is a tone associated with each respective portion of the plurality of portions of the textual representation of the media content.

18. The user equipment of claim 15, wherein the analysis is a cognitive analysis and the determined characteristic associated with each respective portion of the plurality of portions of the textual representation of the media content is a cognitive dimension associated with each respective portion of the plurality of portions of the textual representation of the media content.

19. The user equipment of claim 15, wherein the processor further generates a configuration file including the multi-dimensional model and associates the configuration file with the media content.

20. The user equipment of claim 15, wherein the temporal boundaries include at least one of a change in page, a change in chapter, a change in scene, a change in act, a change in dialog, or a change in verse.

* * * * *